(12) United States Patent
Dong et al.

(10) Patent No.: US 8,351,349 B2
(45) Date of Patent: Jan. 8, 2013

(54) METHOD AND SYSTEM FOR REALIZING LOCATION MANAGEMENT OF MULTIHOMED TERMINALS IN UNIVERSAL NETWORK

(75) Inventors: Ping Dong, Beijing (CN); Haisheng Jiang, Beijing (CN); Hongke Zhang, Beijing (CN); Dong Yang, Beijing (CN); Yajuan Qin, Beijing (CN); Xiaobo Liu, Beijing (CN); Feng Qiu, Beijing (CN)

(73) Assignee: Beijing Jiaotong University, Beijing (CN)

( * ) Notice: Subject to any disclaimer, the term of this patent is extended or adjusted under 35 U.S.C. 154(b) by 551 days.

(21) Appl. No.: 12/536,920

(22) Filed: Aug. 6, 2009

(65) Prior Publication Data

US 2010/0208617 A1 Aug. 19, 2010

(30) Foreign Application Priority Data

Feb. 19, 2009 (CN) .......................... 2009 1 0077366

(51) Int. Cl.
*H04L 12/28* (2006.01)
(52) U.S. Cl. ...................................................... 370/254
(58) Field of Classification Search .................. 370/254, 370/395.31, 331
See application file for complete search history.

(56) References Cited

U.S. PATENT DOCUMENTS

2007/0025292 A1* 2/2007 Maksymczuk et al. ........ 370/331
2011/0153792 A1* 6/2011 Bachmann et al. ............ 709/221

OTHER PUBLICATIONS

Nordmark, et al, "Shim6: Level 3 Multihoming Shim Protocol for IPv6," The Internet Engineering Task Force (IETF), RFC5533, http://www.ietf.org, (Jun. 2009).

* cited by examiner

*Primary Examiner* — Dang Ton
*Assistant Examiner* — Kevin Lee
(74) *Attorney, Agent, or Firm* — Hammer & Associates, P.C.

(57) ABSTRACT

In Universal Network, there is disclosed a method and system for realizing location management of multihomed terminals, the system comprises home domains and foreign domains, in which the home domains of a multihomed terminal refer to the domains managing the multihomed terminal; the other domains are the foreign domains of the multihomed terminal; each domain includes at least one Identifier Mapping Server and one Accessing-Switching Router; the Identifier Mapping Server memorizes and manages the mapping information; and the Accessing-Switching Router allocates the mapping information for multihomed terminals. This invention facilitates the implement of multihoming in the Internet and makes the network resources be used efficiently. Especially, the Internet service providers can manage the multihomed terminals easily and efficiently.

6 Claims, 3 Drawing Sheets

| AID |
|---|
| SRID-1,<br>Function-1,<br>Valid-1,<br>SRID-1 of the ASR to which the interface attaches,<br>SRID-1 of the IDMS in the home domain |
| SRID-2,<br>Function-2,<br>Valid-2,<br>SRID-2 of the ASR to which the interface attaches,<br>SRID-2 of the IDMS in the home domain |
| ...... |
| SRID-n,<br>Function-n,<br>Valid-n,<br>SRID-n of the ASR to which the interface attaches,<br>SRID-n of the IDMS in the home domain |

METHOD AND SYSTEM FOR REALIZING LOCATION MANAGEMENT OF MULTIHOMED TERMINALS IN UNIVERSAL NETWORK

FIELD OF THE INVENTION

The present invention relates to computer networks. More specifically, it refers to a method and system for realizing location management of multihomed terminal in Universal Network.

The term "Multihoming" in this patent specification is interpreted as an accessing method that a terminal or site connects to the Internet through more than one Internet Service Providers (ISPs).

BACKGROUND OF THE INVENTION

In the current Internet, the typical protocol supporting multihoming is the Level 3 Multihoming Shim Protocol for IPv6 (Shim6) at http://www.ietf.org/html.charters/shim6-charter.html. It is developed by the Internet Engineering Task Force (IETF).

In Shim6, a shim layer providing a stable Upper Layer Identifier (ULID) for the upper protocol is added to the IP layer of the protocol stack in the terminal. When different IP addresses are selected to fulfill multihoming demand in the IP layer, the stability of the upper protocols is guaranteed by the uniform ULID.

However, since the Shim6 is a terminal based multihoming solution, it has several drawbacks: 1) the protocol stack of a terminal must be modified to fulfill multihoming requirements. Because the amount and categories of the multihomed terminals are very large, it will cost too much time to modify the protocol stacks of all terminals. 2) All terminals have to cooperate with each other to support multihoming, which will waste the link resources. In particular, the messages transmitting among the terminals will make the limited radio link resources more scarcely when the wireless links are used to connect the terminal with the network. 3) The terminal based multihoming scheme also brings negative impacts on the ISPs so that the behaviors of the terminal cannot be controlled and managed. Thus, for those ISPs, the difficulty to maintain the network and the cost to operate the network are all increased.

SUMMARY OF THE INVENTION

The object of the present invention is to provide a method and system for realizing location management of multihomed terminals in Universal Network. According to the method and system disclosed herein, it is easier to obtain multihoming functionality. Further more, the network resources can be used effectively, and the management of multihoming user can be easier for the network administrator.

Therefore, according to one aspect of the present invention, a method is provided to achieve location management of the multihomed terminal in Universal Network. The method is broadly characterized in that: if one multihomed terminal associated to Universal Network for the first time, the Accessing-Switching Router (ASR) in Universal Network allocates the Switching-Routing Identifier (SRID) and creates the mapping information for the multihomed terminal, and reports the mapping information to the Identifier Mapping Server (IDMS) in the multihomed terminal's home domain; coming up the IDMS in the home domain memorizes the mapping information, and synchronizes the mapping information within all the home IDMSes of the multihomed terminal to finish location registration; and if one multihomed terminal has already associated to Universal Network, when the ASR to which the multihomed terminal attaches detects that the multihomed terminal's access state has changed it modifies the mapping information of the multihomed terminal and reports this changes to the IDMS; then all of the IDMSes in the multihomed terminal's home domains update the mapping information and notify the new mapping information to the ASR of the Correspondent Node (CN) for completing location update.

According to another aspect of the present invention, a system is provided to realize location management of the multihomed terminal in Universal Network. It is broadly characterized in that: the system comprises home domains and foreign domains, in which the home domains of a multihomed terminal refer to the domains that the ASRs to which the interfaces of the multihomed terminal attaches locates at; the other domains are the foreign domains of the multihomed terminal; each home domain and foreign domain include at least one Identifier Mapping Server and one Accessing-Switching Router; the Identifier Mapping Server memorizes and manages the mapping information; and the Accessing-Switching Router allocates the mapping information for multihomed terminals.

According to the present invention, by the message switching scheme between ASRs and IDMSes in the network, the protocol stack of the multihomed terminal is not required to modify, which cuts down the cost of the direct messages interaction between the terminal and the CN; in the meanwhile, the network link resources are effectively managed. The scheme also facilitates location registration and update of the multihomed terminals.

According to the present invention, the Access Identifier (AID) that indicates the identity of the multihomed terminal is unique in Universal Network. Based on the knowledge of multihoming, in Universal network the multihomed terminal ought to attach to multiple ASRs. These ASRs will respectively allocate distinct SRIDs for the multihomed terminal. From the viewpoint of the whole network, one AID is related to many SRIDs, which indicates that the AID belongs to a terminal that adopts multihoming technology. This conforms the requirement for the multihomed terminal in Universal network.

According to the present invention, when achieving the redundancy, the invention can be used to facilitate location update of the multihomed terminal and maintain the continuity of the communication. Moreover, the invention is used to realize the unified management for the location information of the multihomed terminal in Universal Network. Based on the scheme, IDMSes and ASRs are designed to track after the terminal for indicating the location information. The multihomed terminal initiates the link switching on the basis of the requirements, and selects to access the favorite ASRs. The present invention can achieve location registration and update for the multihomed terminal in Universal Network.

DESCRIPTION OF THE PREFERRED EMBODIMENTS

The following detailed description of embodiments of the present invention is made by referring to the accompanying drawings.

Figures 1, 2:
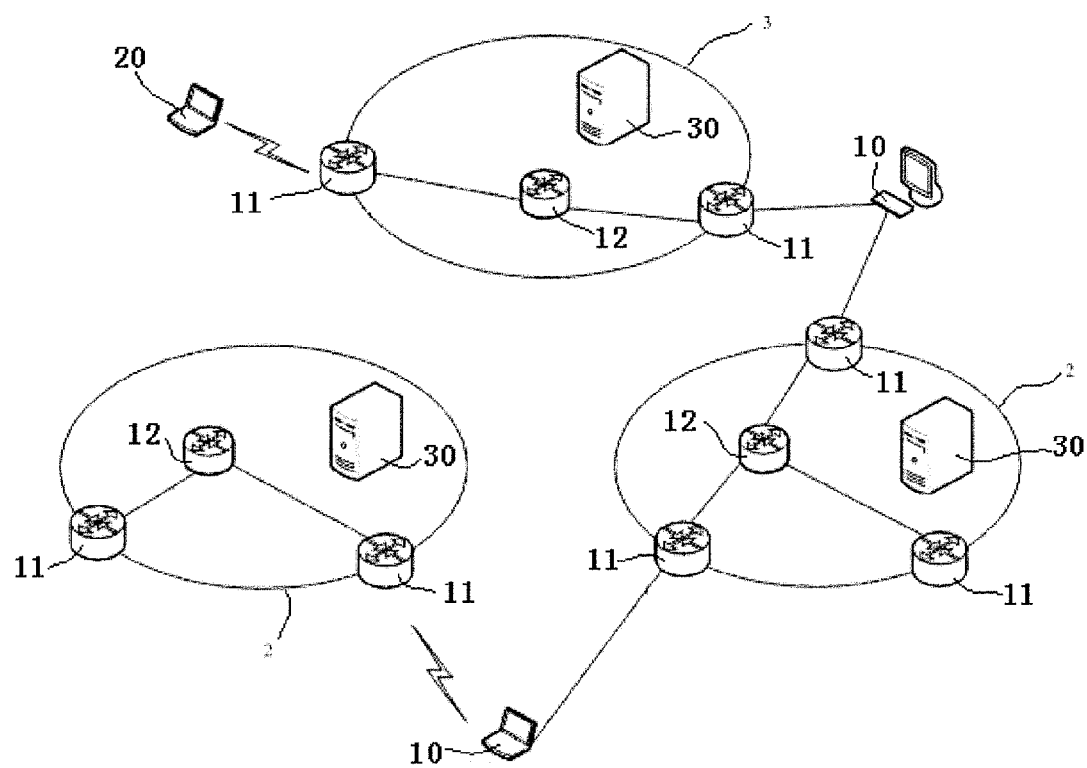
FIG. 1 is an abridged general view of the domain in Universal Network.
FIG. 2 illustrates the definition of the mapping information entry in Universal Network.

FIG. 1 shows the abridged general view of the domain in Universal Network. In FIG. 1, the multihomed terminal is expressed as reference number 10; the reference number 20 indicates the CN; the reference number 30 identifies the IDMS; the ASR is denoted as the reference number 11; the reference numbers 2, 3 presents the domain. As shown in FIG. 1, Universal Network is divided into the home domain 2 and foreign domain 3. This is in terms of which domain that the multihomed terminal 10 belongs to. For the multihomed terminal 10, the home domains 2, 3 refer to the domains in which the interfaces of the multihomed terminal 10 attaches to the ASR11, other domains indicate the foreign domains 2, 3. Each home domain and foreign domains 2, 3 include at least one IDMS30. The IDMS30 is responsible for memorizing and managing the mapping information of the terminal in domains 2, 3. Based on the factors such as the region and the network size, the deployment of the domains 2, 3 can be implemented by the network institution. As each ASR 11 is deployed into Universal Network, it requires the administrator to configure the addresses of the IDMS in the domains 2, 3, that is, the SRIDs of the IDMS; In addition, a set of SRIDs are required for allocating to the accessing terminal.

FIG. 2 is the schematic diagram that is used to define the mapping information entry for the multihomed terminal. In the figure, the "AID" flag indicates the AID of the multihomed terminal; one multihomed terminal attaches to many ASRs by multiple interfaces. The mapping relation between the AID and SRIDs is one to many; therefore the "SRID" flag means the SRID allocated by the ASR to which one of the interfaces of the multihomed terminal attaches; the "function" flag expresses the using mode of the interface, which consists of redundancy mode, load balancing mode, preferences mode and so on; the "valid" flag indicates the user mode of the corresponding interface, and its value includes VALID and INVALID; the "the SRID of the ASR that the interface attaches to" flag refers to the SRID of the attaching ASR; the "the SRID of the home domain IDMS that the interface attaches to" flag indicates the SRID of the home domain IDMS, where the ASR to which the interface of the multihomed terminal attaches is located in this home domain.

In the present invention, the IDMS is used to memorize and manage the identity information and location information of the multihomed terminal in Universal Network. According to the requirements of the storage and management, the tables in the IDMSes are categorized as the home storage table that is used to memorize the mapping information of the terminal in the home domain and the temporary storage table that is used to memorize the mapping information of the CN which communicates with the terminal belonging to the home domain. In the present invention, at the registration stage of the multihomed terminal, multiple ASRs to which many interfaces attach initiate the registration claim. Each IDMS of the homed domain respectively implements the registration for these interfaces in Universal Network, and creates the storage units, and executes the information synchronization among multiple home domains of the multihomed terminal in order to facilitate location query at the beginning of establishing the communication. When the multihomed terminal executes location update, the SRID used to identify location information of the terminal is transformed. Then the ASR to which the slave interfaces attaches initiates location update process. All of IDMSes in the home domains of the multihomed terminal interact with each other. Finally, all of the network entities which memorize location information of this multihomed terminal execute the information update to guarantee the smooth communication process.

Next, according to an embodiment consistent with the accompany diagram, the detailed description of the invention consisting of the process of location registration and location update of the multihomed terminal is expressed as follows.

Figure 3:
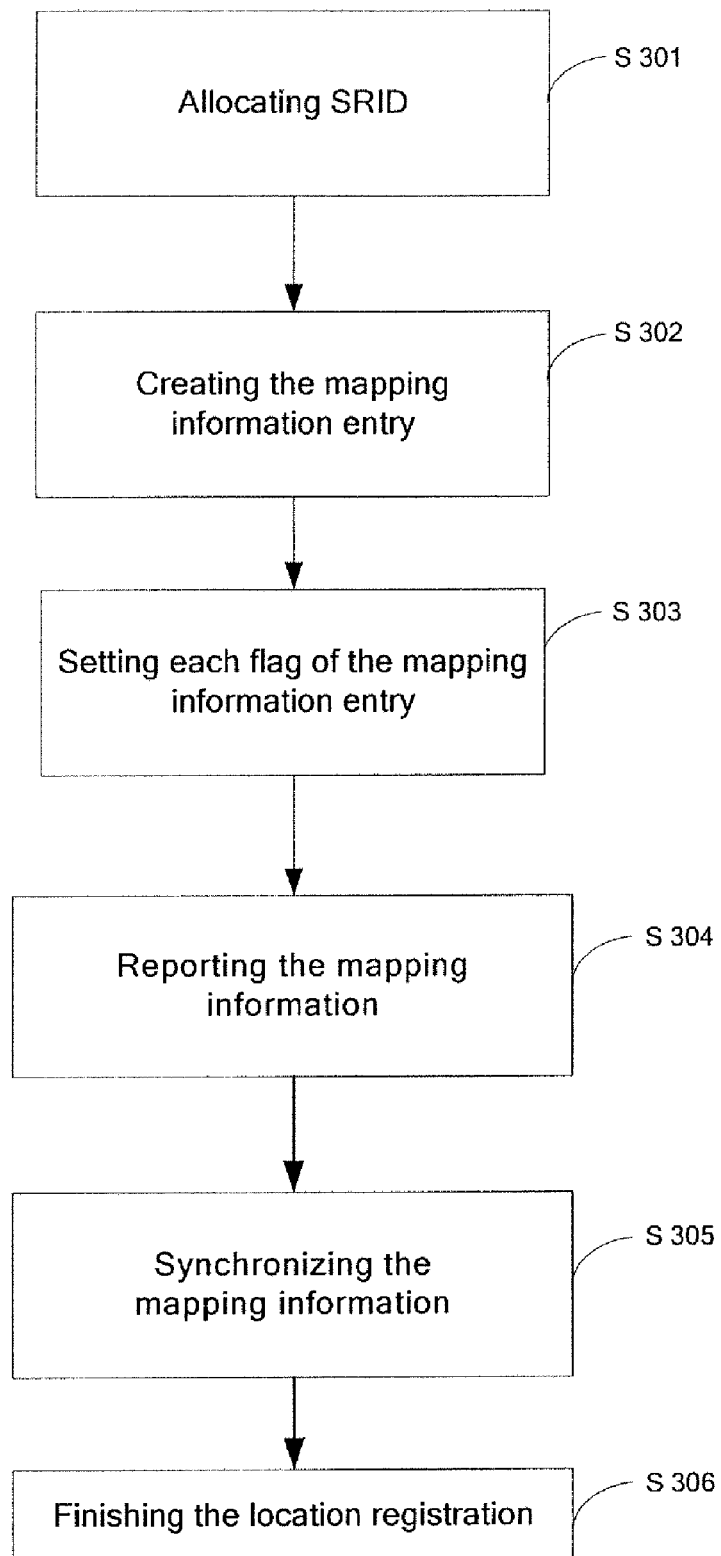
FIG. 3 shows the flow diagram of location registration of the multihomed terminal in a preferred embodiment of the invention.

FIG. 3 indicates location registration process of the multihomed terminal in Universal Network. Location registration in Universal Network is accomplished by the ASRs and the IDMSes, which are used to create the storage units for the multihomed terminal. The multihomed terminal attaches to multiple ASRs from many home domains. Those ASRs respectively detect this multihomed terminal, and pick up the unallocated SRIDs from the SRIDs pool, and allocate them to the multihomed terminal (step 301); then, multiple ASRs to which the multihomed terminal attaches create the mapping information that records the relation between the AID and SRIDs for the terminal (step 302); each flag of the mapping information entry is defined by the initial requirement. The initial requirement is for the redundancy, which defines the "function" flag as "redundancy"; meanwhile, the "valid" flag of the mapping information entry of the master interface is set as VALID, whereas the "valid" flag of the mapping information of the slave interface is set as INVALID (step 303); afterwards, the ASR notifies the mapping information to the IDMS of the home domain; the IDMS will create the storage units after receiving the reporting message (step 304); finally, based on the characteristics of the multihomed terminal, all of IDMSes in the home domains memorizing the mapping information of the multihomed terminal will announce the mapping information with each other. This process is used to synchronize the mapping information memorized in the IDMSes of the home domains (step 305); in this way, location registration process of the multihomed terminal is finished (step 306).

Figure 4:
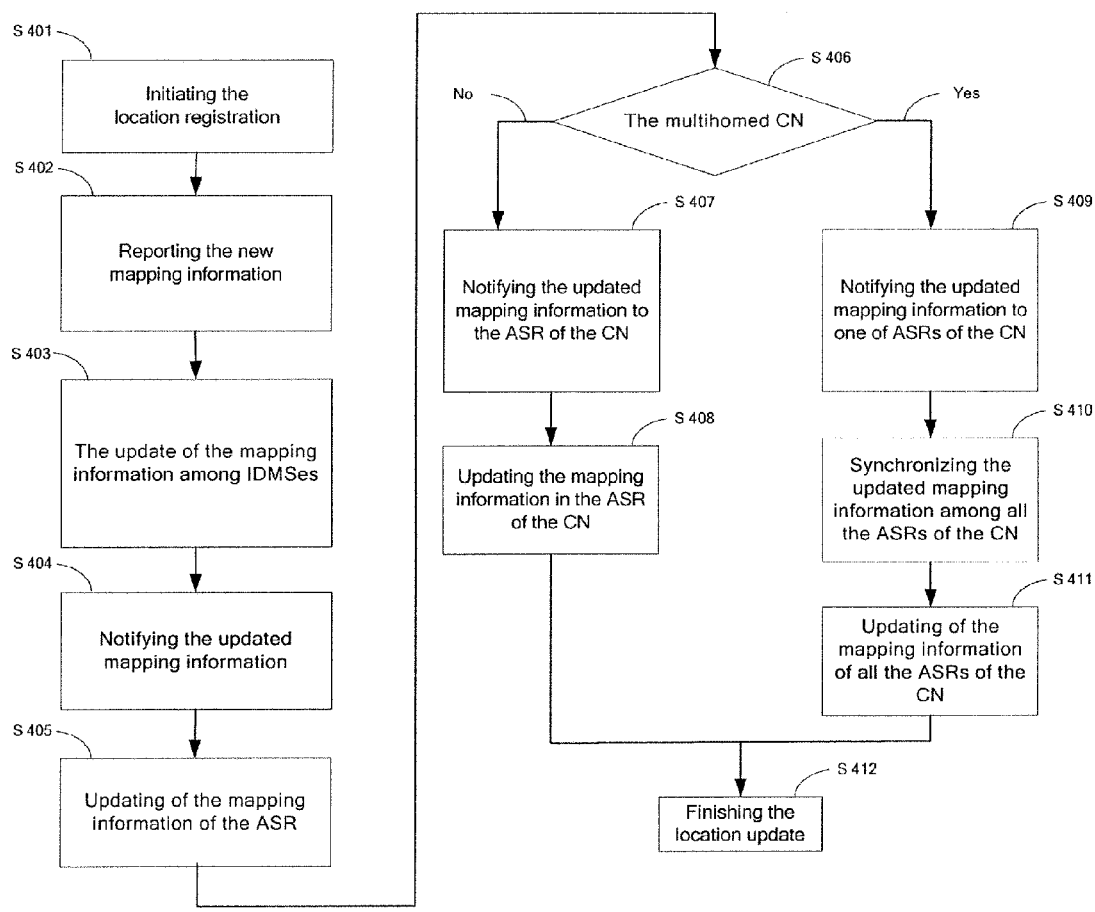
FIG. 4 presents the flow diagram of location update of the multihomed terminal in the preferred embodiment of the invention.

Location update process of the multihomed terminal is described as follows: when the ASRs detect the accessing state of the multihomed terminal has been changed, they initiate location update process for the multihomed terminal. As shown in FIG. 4, the detailed steps that will be implemented during the process of location update in the multihomed terminal include:

Firstly, the ASR to which the master interface of the multihomed terminal attaches detects modification of the accessing states of the multihomed terminal and raises location update (step 401); the ASR to which the master interface of the multihomed terminal attaches modifies the "valid" flag of the mapping information from "VALID" to "INVALID" and reports the mapping information to the IDMS managing this ASR and locating in the home domain (step 402); the IDMS updates the mapping information of the multihomed terminal, and notifies the new mapping information to the IDMSes of other home domains which manage the ASRs to which the slave interface of the multihomed terminal attaches (step 403); the IDMSes, which manage the ASRs to which the slave interfaces of the multihomed terminal attach, report the new mapping information to the ASRs to which the slave interface of the multihomed terminal attach (step 404); the ASRs to which the slave interfaces attaches update the mapping information of the multihomed terminal (step 405); then, according to the derived information of the CN, the network administrator will estimate whether the CN will be a multihomed terminal (step 406); if the result is "No", the ASR to which the master interface of the multihomed terminal attaches immediately notifies the new mapping information to the ASR to which the CN attaches (step 407); the ASR to which the CN attaches memorizes the new mapping information of the multihomed terminal (step 408); if the result is "Yes", the ASR to which the master interface of the multihomed terminal attaches notifies the new mapping information to the ASR to which one of interfaces of the CN attaches (step 409); the ASR that receives the new mapping information notifies the new mapping information to other ASRs to which the other interfaces of the CN attach (step 410); all of ASRs to which the CN attaches memorize the new mapping information of the multihomed terminal (step 411), at last location update is finished (step 412).

The present embodiment is used to describe the process of the multihomed terminal accessing Universal Network. Then the multihomed terminal is allocated the mapping information while the identity information and location information are registered in the IDMSes to finish location registration; Based on the requirements, the multihomed terminal executes location update and sends location update announcement to the IDMSes by the ASRs to which it attaches. With the information interaction among those related entities, location information of the multihomed terminal is updated all over the network, which can facilitate to establish the communication association. In the meanwhile, the communication will be continuous when the link switching happens.

The foregoing description of the embodiments of the invention has been presented for the purpose of illustration and description only. It is not intended to be exhaustive or to limit the invention to the specific forms disclosed. It is evident that many alternatives, modifications, permutations and variations will become apparent to those of ordinary claims in light of the foregoing description.

Accordingly, it is intended that the present invention embrace all such alternatives, modifications and variations as fall within the scope of the appended claims.

The invention claimed is:

1. A method for realizing location management of multihomed terminals in Universal Network, characterized in that:
   if one multihomed terminal associated to Universal Network for the first time, an Accessing-Switching Router (ASR) in Universal Network allocates a Switching-Routing Identifier (SRID) and creates a mapping information for the multihomed terminal, and reports the mapping information to an Identifier Mapping Server (IDMS) in a multihomed terminal's home domain; coming up the IDMS in the home domain memorizes the mapping information, and synchronizes the mapping information within all home IDMSes of the multihomed terminal to finish location registration; and
   if one multihomed terminal has already associated to Universal Network, when the ASR to which the multihomed terminal attaches detects that a multihomed terminal's access state has changed it modifies the mapping information of the multihomed terminal and reports this changes to the IDMS; then all of the IDMSes in the multihomed terminal's home domains update the mapping information and notify the new mapping information to the ASR of a Correspondent Node (CN) for completing location update,
   the location registration comprises the following steps: all of ASRs to which multihomed terminals attach allocate SRIDs for the multihomed terminals respectively;
   each ASR creates the mapping information for the multihomed terminal, the content of the mapping information entry comprises an Accessing Identifier (AID), a SRID, a "function" flag, a "valid" flag, several bits recording the "SRID of the ASR that the multihomed terminal attaches to", and several bits recording the "SRID of the IDMS in the multihomed terminal's home domain"; therein the "function" flag is set as "redundancy"; interfaces of the multihomed terminal are categorized into a master interface and a slave interface; the "valid" flag is set as "VALID" in the mapping information of the master interface, while the "valid" flag is set as "INVALID" in the mapping information of the slave interface;
   the ASR reports the mapping information to the IDMS which locates in the multihomed terminal's home domain; and
   all of IDMSes which memorize the multihomed terminal's mapping information announce the mapping information with each other; thus, the mapping information of the multihomed terminal that memorized in the IDMSes are synchronized.

2. The method as recited in claim 1, characterized in that:
   if the CN is not a multihomed terminal, the process, which the ASR that the master interface of the multihomed terminal attaches to notifies the new mapping information to the ASR to which the CN attaches, comprising the following steps:
   the ASR to which the master interface of the multihomed terminal attaches immediately notifies the new mapping information to the ASR to which the CN attaches; and
   the ASR to which the CN attaches updates the memorized mapping information of the multihomed terminal.

3. The method as recited in claim 1, characterized in that:
   if the CN is a multihomed terminal, the process, which the ASR that the master interface of the multihomed terminal attaches to notifies the new mapping information to the ASR to which the CN attaches, comprising the following steps:
   the ASR to which the master interface of the multihomed terminal attaches notifies the new mapping information to the ASR to which one of interfaces of the CN attaches;
   the ASR which has received the new mapping information notifies the new mapping information to the other ASRs that other interfaces of the CN attach to; and
   all of ASRs to which the CN attaches update and memorize the mapping information of the multihomed terminal.

4. A method for realizing location management of multihomed terminals in Universal Network, characterized in that:
   if one multihomed terminal associated to Universal Network for the first time, an Accessing-Switching Router (ASR) in Universal Network allocates a Switching-Routing Identifier (SRID) and creates a mapping information for the multihomed terminal, and reports the mapping information to an Identifier Mapping Server (IDMS) in a multihomed terminal's home domain; coming up the IDMS in the home domain memorizes the mapping information, and synchronizes the mapping information within all home IDMSes of the multihomed terminal to finish location registration; and
   if one multihomed terminal has already associated to Universal Network, when the ASR to which the multihomed terminal attaches detects that a multihomed terminal's access state has changed it modifies the mapping information of the multihomed terminal and reports this changes to the IDMS; then all of the IDMSes in the multihomed terminal's home domains update the mapping information and notify the new mapping information to the ASR of a Correspondent Node (CN) for completing location update, said location update comprises the following steps:
the ASR to which the master interface of the multihomed terminal attaches actively detects modification of accessing states of the multihomed terminal;
the ASR to which the master interface of the multihomed terminal attaches modifies the "valid" flag in the mapping information entry of the multihomed terminal from "VALID" to "INVALID", and reports the modification of the mapping information to the IDMS;
the home domain IDMS which manages the ASR that the master interface of the multihomed terminal attaches to updates the mapping information of the multihomed terminal, and notifies the new mapping information to the IDMS of other home domains which manage the ASRs that the slave interfaces of the multihomed terminal attaches to;
the home domain IDMS which manage the ASRs that the slave interfaces of the multihomed terminal attaches to reports the new mapping information to the ASRs to which the slave interface of the multihomed terminal attaches;
the ASRs to which the slave interfaces attaches update the mapping information of the multihomed terminal; and
the ASR to which the master interface attaches notifies the new mapping information to the ASR to which the CN attaches for updating the memorized mapping information of the multihomed terminal.

5. The method as recited in claim 4, characterized in that:
if the CN is not a multihomed terminal, the process, which the ASR that the master interface of the multihomed terminal attaches to notifies the new mapping information to the ASR to which the CN attaches, comprising the following steps:
the ASR to which the master interface of the multihomed terminal attaches immediately notifies the new mapping information to the ASR to which the CN attaches; and
the ASR to which the CN attaches updates the memorized mapping information of the multihomed terminal.

6. The method as recited in claim 4, characterized in that:
if the CN is a multihomed terminal, the process, which the ASR that the master interface of the multihomed terminal attaches to notifies the new mapping information to the ASR to which the CN attaches, comprising the following steps:
the ASR to which the master interface of the multihomed terminal attaches notifies the new mapping information to the ASR to which one of interfaces of the CN attaches;
the ASR which has received the new mapping information notifies the new mapping information to the other ASRs that other interfaces of the CN attach to; and
all of ASRs to which the CN attaches update and memorize the mapping information of the multihomed terminal.

* * * * *